United States Patent
Mizuno (10) Patent No.: US 12,023,956 B2
(45) Date of Patent: Jul. 2, 2024

(54) DECORATIVE MEMBER MANUFACTURING APPARATUS AND METHOD FOR MANUFACTURING DECORATIVE MEMBER

(71) Applicant: FUJIFILM Corporation, Tokyo (JP)

(72) Inventor: Tomohiro Mizuno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 634 days.

(21) Appl. No.: 17/211,807

(22) Filed: Mar. 24, 2021

(65) Prior Publication Data

US 2021/0206195 A1 Jul. 8, 2021

Related U.S. Application Data

(63) Continuation of application No. PCT/JP2019/033036, filed on Aug. 23, 2019.

(30) Foreign Application Priority Data

Sep. 27, 2018 (JP) ................. 2018-182102

(51) Int. Cl.
*H04N 1/034* (2006.01)
*B44C 1/20* (2006.01)
(Continued)

(52) U.S. Cl.
CPC ............... *B44C 1/20* (2013.01); *H04N 1/034* (2013.01); *H04N 1/605* (2013.01); *B33Y 10/00* (2014.12)

(58) Field of Classification Search
CPC ........ H04N 1/034; H04N 1/605; B33Y 10/00; B41M 7/0081; B41J 11/00214; B41J 11/0021; B44C 3/025
See application file for complete search history.

(56) References Cited

U.S. PATENT DOCUMENTS 9,469,101 B2 10/2016 Kubo et al.
10,321,016 B2 6/2019 Kubo
(Continued)

FOREIGN PATENT DOCUMENTS

JP H08254472 10/1996
JP 2004299058 10/2004
(Continued)

OTHER PUBLICATIONS

"International Search Report (Form PCT/ISA/210) of PCT/JP2019/033036," mailed on Nov. 5, 2019, with English translation thereof, pp. 1-6.
(Continued)

*Primary Examiner* — Ted W Barnes
(74) *Attorney, Agent, or Firm* — JCIPRNET (57) ABSTRACT

Provided are a decorative member manufacturing apparatus and method for manufacturing a decorative member, which are capable of reducing an amount of fluid used without impairing a texture of a decorative layer.

In the decorative member manufacturing apparatus and method for manufacturing a decorative member of the present invention, a fluid cured by receiving light is jetted from a jetting part toward a surface of a base material, the fluid which has landed on respective portions is irradiated with light from an irradiation part to form a cured convex portion constituting the decorative layer on the respective portions on the surface of the base material, and the jetting part is controlled based on control data for forming the cured convex portion having a set thickness in the respective portions. In addition, correction processing is performed by a correction part on the control data, the correction processing being a process of reducing a thickness corresponding to a spatial frequency equal to or smaller than a set value, in a correspondence relationship between the thickness and spa- (Continued)

tial frequency of the cured convex portion which is formed in a case where the jetting part is controlled based on the control data.

17 Claims, 7 Drawing Sheets

(51) Int. Cl.
    *H04N 1/60*     (2006.01)
    *B33Y 10/00*     (2015.01)

(56) References Cited

U.S. PATENT DOCUMENTS

| | | |
|---|---|---|
| 10,399,324 B2 | 9/2019 | Kubo et al. |
| 2004/0189768 A1* | 9/2004 | Konno ............... B41J 3/4073 347/101 |
| 2012/0242767 A1* | 9/2012 | Kondo ............. B41J 11/00214 347/102 |
| 2012/0268537 A1* | 10/2012 | Takahashi ............... H04N 1/54 347/102 |
| 2017/0041479 A1* | 2/2017 | Kubo ................. B33Y 30/00 |
| 2017/0291427 A1* | 10/2017 | Kubo ................. G06K 15/021 |
| 2020/0114662 A1* | 4/2020 | Sevenich ............. B41J 2/2052 |

FOREIGN PATENT DOCUMENTS

| | | | | |
|---|---|---|---|---|
| JP | 2012223997 | | 11/2012 | |
| JP | 2016013671 | | 1/2016 | |
| JP | 2016013671 A | * | 1/2016 | ........... B29C 64/112 |
| JP | 2016074146 | | 5/2016 | |
| JP | 2017035876 | | 2/2017 | |
| JP | 2017035876 A | * | 2/2017 | ........... B29C 64/112 |
| WO | 2012163212 | | 12/2012 | |

OTHER PUBLICATIONS

"Written Opinion of the International Searching Authority (Form PCT/ISA/237) of PCT/JP2019/033036," mailed on Nov. 5, 2019, with English translation thereof, pp. 1-9.

Office Action of Japan Counterpart Application, with English translation thereof, issued on Jan. 25, 2022, pp. 1-6.

"Search Report of Europe Counterpart Application", issued on Oct. 26, 2021, p. 1-p. 5.

* cited by examiner

DECORATIVE MEMBER MANUFACTURING APPARATUS AND METHOD FOR MANUFACTURING DECORATIVE MEMBER

CROSS-REFERENCE TO RELATED APPLICATIONS

This application is a Continuation of PCT International Application No. PCT/JP2019/033036 filed on Aug. 23, 2019, which claims priority under 35 U.S.C. § 119(a) to Japanese Patent Application No. 2018-182102 filed on Sep. 27, 2018. The above application is hereby expressly incorporated by reference, in its entirety, into the present application.

BACKGROUND OF THE INVENTION

1. Field of the Invention

The present invention relates to a decorative member manufacturing apparatus and a method for manufacturing a decorative member, and particularly, relates to a decorative member manufacturing apparatus and a method for manufacturing a decorative member, in which a decorative member having a decorative layer on a surface of a base material is manufactured using a fluid cured by receiving light.

2. Description of the Related Art

As an apparatus for manufacturing a decorative member having an unevenly shaped decorative layer, an inkjet printer and the like, in which a fluid, such as clear ink, cured by receiving light is jetted toward a surface of a base material and the landed fluid is irradiated with light, has been known. In such an apparatus, the texture of the decorative layer can be adjusted by controlling the amount and landing position of the fluid to be used, the thickness after curing (that is, a cured convex portion), and the like.

Furthermore, in recent years, an apparatus that appropriately reproduces unevenness in a case of forming a decorative layer based on data for forming a decorative layer (hereinafter, also referred to as unevenness data) has been developed. For example, in an unevenness forming apparatus disclosed in JP2016-013671A, unevenness data are obtained, unevenness is formed based on the obtained unevenness data, and based on feature amount (specifically, frequency component of the unevenness data, and the like) of the unevenness represented by the unevenness data, operating conditions (specifically, type of ink used, irradiation intensity of light, and the like) in a case of forming the unevenness is changed. With the apparatus configured in this way, the sharpness and smoothness of the unevenness can be appropriately reproduced.

As another example of an apparatus for appropriately reproducing the unevenness, an unevenness forming apparatus disclosed in JP2016-074146A is exemplified. In forming unevenness on a recording medium based on unevenness data, this apparatus corrects the unevenness data according to frequency band and amplitude of the unevenness data based on frequency response characteristics in a case of forming the unevenness. With the apparatus configured in this way, even in a case where the frequency response characteristics change depending on the amplitude amount of input data and the operating condition of the apparatus, it is possible to flexibly respond to the change and form an uneven shape having good characteristics.

SUMMARY OF THE INVENTION

In a case of manufacturing a decorative member having an unevenly shaped decorative layer, from the viewpoint of reducing manufacturing cost and improving manufacturing speed, it is required to reduce the amount of fluid used. In particular, in a case of overlapping a fluid such as clear ink on a surface of a base material to give a texture, for the purpose of enhancing the reality of the touch, it is necessary to apply more fluid than usual, which may slow down the manufacturing speed (specifically, the forming speed of the decorative layer). Such a problem is prominent in a case of being adopted to a shuttle scan type inkjet printing method, which can be an obstacle to expanding the market for decorative members.

In addition, understandably, in a case of reducing the amount of fluid used, it is necessary to reduce the amount of fluid used so as not to impair the texture (specifically, unevenness felt by a person) of the decorative layer.

On the other hand, in the above-described apparatuses disclosed in JP2016-013671A and JP2016-074146A, although the operating condition of the apparatus is changed and the unevenness data is corrected for the purpose of forming the unevenness well, it is not possible to reduce the amount of fluid used without impairing the texture of the decorative layer.

The present invention has been studied in view of such circumstances, and an object of the present invention is to achieve the following objects.

To solve the above-described problems of the prior art, an object of the present invention is to provide a decorative member manufacturing apparatus and method for manufacturing a decorative member, which are capable of reducing an amount of fluid used without impairing a texture of a decorative layer.

In order to achieve the above-described object, a decorative member manufacturing apparatus according to an aspect of the present invention is a decorative member manufacturing apparatus for manufacturing a decorative member having a decorative layer provided on a surface of a base material, the decorative member manufacturing apparatus comprising:

a jetting part that jets a fluid toward the surface of the base material, the fluid being cured by receiving light;
an irradiation part that, to form a cured convex portion constituting the decorative layer on respective portions on the surface of the base material, irradiates the fluid which has landed on the respective portions with light;
a control part that controls the jetting part based on control data for forming the cured convex portion having a set thickness in the respective portions; and
a correction part that performs correction processing on the control data, the correction processing being a process of reducing a thickness corresponding to a spatial frequency equal to or smaller than a set value, in a correspondence relationship between the thickness and spatial frequency of the cured convex portion which is formed in a case where the control part controls the jetting part based on the control data.

With the decorative member manufacturing apparatus according to the aspect of the present invention configured as described above, in a case where a decorative member having an unevenly shaped decorative layer is manufactured by using a fluid which cures by receiving light, it is possible to reduce the amount of fluid used without impairing the texture of the decorative layer.

In addition, with regard to the above-described decorative member manufacturing apparatus, it is more suitable that the correction processing is a process of weighting a thickness of the cured convex portion according to a spatial frequency corresponding thereto, and in the correction processing, a weight of less than 1 is given to the thickness of the cured convex portion corresponding to the spatial frequency equal to or smaller than the set value, and a weight equal to 1 is given to a thickness of the cured convex portion corresponding to a spatial frequency larger than the set value.

According to the above-described configuration, in the correction processing, a weight of less than 1 is given to the thickness of the cured convex portion corresponding to the spatial frequency equal to or smaller than the set value. As a result, the thickness of the cured convex portion corresponding to the spatial frequency equal to or smaller than the set value is reduced, and the amount of fluid used is reduced accordingly.

In addition, with regard to the above-described decorative member manufacturing apparatus, it is more suitable that the correction part performs the correction processing using a weighting filter, the weighting filter is a filter created based on an equal sensation curve indicating a change in feature amount of a stimulus that a person feels to have the same intensity by a tactile sensation in association with a generation frequency of the stimulus, and the set value is a value set according to the generation frequency of the stimulus having a minimum feature amount in the equal sensation curve.

According to the above-described configuration, the weighting filter is created and the set value is set based on the equal sensation curve. As a result, it is possible to appropriately determine the weighting filter and the set value according to the spatial frequency of the unevenness which is difficult to feel by the human tactile sensation.

The generation frequency of the stimulus, at which the feature amount is smallest in the equal sensation curve, may be 250 Hz.

In addition, with regard to the above-described decorative member manufacturing apparatus, it is more suitable that, in the correction processing, the weight given to the thickness of the cured convex portion corresponding to the spatial frequency equal to or smaller than the set value increases as the spatial frequency increases.

According to the above-described configuration, a weight given to the thickness of the cured convex portion corresponding to the spatial frequency equal to or smaller than the set value increases as the spatial frequency increases. Therefore, in the spatial frequency equal to or smaller than the set value, the thickness of the cured convex portion can be gradually changed, and it is possible to suppress a sense of discomfort which occurs in a case where the thickness suddenly changes (changes discontinuously).

In addition, with regard to the above-described decorative member manufacturing apparatus, it is more suitable that the weighting filter is a high-pass filter in which a peak value is set in a range of 1 to 6.5 cycle/mm.

Here, it is still more suitable that the weighting filter is a high-pass filter in which a peak value is set to 1.8 cycle/mm.

According to the above-described configuration, the weighting filter corresponds to the spatial frequency of the unevenness which is difficult to feel with the tactile sensation of a human fingertip. By using such a weighting filter, the thickness of the cured convex portion formed at a spatial frequency which is difficult to feel with the tactile sensation of a human fingertip can be appropriately reduced, and the amount of fluid used can be reduced accordingly.

In addition, with regard to the above-described decorative member manufacturing apparatus, it is more suitable that the correction processing is a process of reducing the thickness of the cured convex portion corresponding to the spatial frequency equal to or smaller than the set value in the correspondence relationship, and setting a thickness of the cured convex portion corresponding to a spatial frequency equal to or smaller than a threshold value which is smaller than the set value in the correspondence relationship to 0, and the threshold value is a limit value of a spatial frequency of the cured convex portion, at which the person can recognize the cured convex portion by a tactile sensation.

According to the above-described configuration, the thickness of the cured convex portion corresponding to the spatial frequency equal to or smaller than the threshold value which is smaller than the set value is set to 0, and the amount of fluid used can be further reduced accordingly.

In addition, with regard to the above-described decorative member manufacturing apparatus, it is more suitable that, in the cured convex portion generated in a case where the control part controls the jetting part based on the corrected control data, a central portion of the cured convex portion that the thickness has been reduced by the correction is recessed by an amount corresponding to an amount of reduction in thickness.

According to the above-described configuration, the amount of fluid used can be reduced as the thickness is reduced. Furthermore, for example, in a case where the thickness is reduced to 0, it is not necessary to jet the fluid to that portion, so that the manufacturing speed of the decorative member can be improved (that is, the time required for the fluid jetted is shortened) accordingly.

In addition, in order to achieve the above-described object, a method for manufacturing a decorative member according to an aspect of the present invention is a method for manufacturing a decorative member having a decorative layer provided on a surface of a base material, the method comprising: a jetting step of jetting, by a jetting part, a fluid toward the surface of the base material, the fluid being cured by receiving light; and an irradiation step of irradiating, by an irradiation part, the fluid which has landed on the respective portions with light, to form a cured convex portion constituting the decorative layer on respective portions on the surface of the base material, in which, in the jetting step, the jetting part is controlled by a control part based on control data for forming the cured convex portion having a set thickness in the respective portions, and correction processing is performed by a correction part on the control data, the correction processing being a process of reducing a thickness corresponding to a spatial frequency equal to or smaller than a set value, in a correspondence relationship between the thickness and spatial frequency of the cured convex portion which is formed in a case where the control part controls the jetting part based on the control data.

According to the above-described method, in a case where a decorative member having an unevenly shaped decorative layer is manufactured by using a fluid which cures by receiving light, it is possible to reduce the amount of fluid used without impairing the texture of the decorative layer.

According to the present invention, a decorative member manufacturing apparatus and method for manufacturing a decorative member, which are capable of reducing an amount of fluid used without impairing a texture of a decorative layer, are realized.

DESCRIPTION OF THE PREFERRED EMBODIMENTS

Hereinafter, a decorative member manufacturing apparatus and method for manufacturing a decorative member according to an embodiment of the present invention (present embodiment) will be described in detail with reference to suitable embodiments shown in the accompanying drawings.

It should be noted that the embodiments described below are merely examples for facilitating the understanding of the present invention, and do not limit the present invention. That is, the present invention can be modified or improved from the embodiments described below without departing from the spirit of the present invention. In addition, understandably, the present invention includes an equivalent thereof.

In addition, in the present specification, a numerical range represented using "to" means a range including numerical values described before and after the preposition "to" as a lower limit value and an upper limit value.

[Decorative Member Manufacturing Apparatus]

Figure 1:
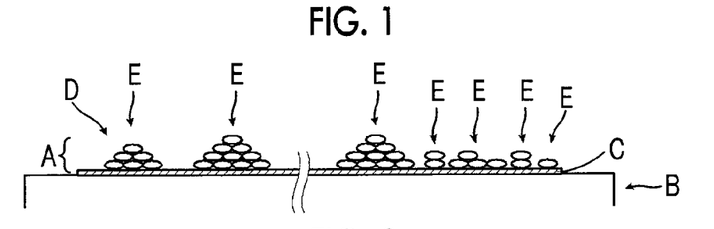
FIG. 1 is a diagram showing a schematic cross section of a decorative layer.

A decorative member manufacturing apparatus 10 of the present embodiment is an apparatus for manufacturing a decorative member using color ink and clear ink. The decorative member is manufactured by forming an unevenly shaped decorative layer on a surface of a base material, and the decorative layer imparts a predetermined texture (tactile sensation) to the decorative member. The base material consists of papers such as single-cut sheet and roll paper, resin films (for example, plastic films), and sheet, wooden, glass, ceramic, metal, or resin boards and panels. As shown in FIG. 1, a decorative layer A is formed by superimposing a clear ink image D formed by clear ink on a color ink image C printed by color ink on a surface of a base material B. FIG. 1 is a diagram showing a schematic cross section of the decorative layer A.

In the present embodiment, the decorative layer A is formed by superimposing the clear ink image D on the color ink image C, but the present invention is not limited thereto. The decorative layer A may be formed by first forming the clear ink image D and recording (printing) the color ink image C thereon. Alternatively, instead of forming each of the color ink image C and the clear ink image D separately, the decorative layer A may be formed by using colored UV-curable type ink or the like.

In addition, decorative layer A has an uneven shape as shown in FIG. 1, in other words, the thickness of each portion of the decorative layer A is a size set according to each portion, and is different between the portions. Here, each portion of the decorative layer A is constituted of a cured convex portion E formed by curing the clear ink which has landed on respective portions on the surface of the base material. The cured convex portion E is constituted of one layer or two or more layers of cured clear ink. In addition, the thickness of the cured convex portion E corresponds to the thickness of each portion of the decorative layer A, and increases as the number of lamination layers of the cured clear ink increases.

Figure 2:
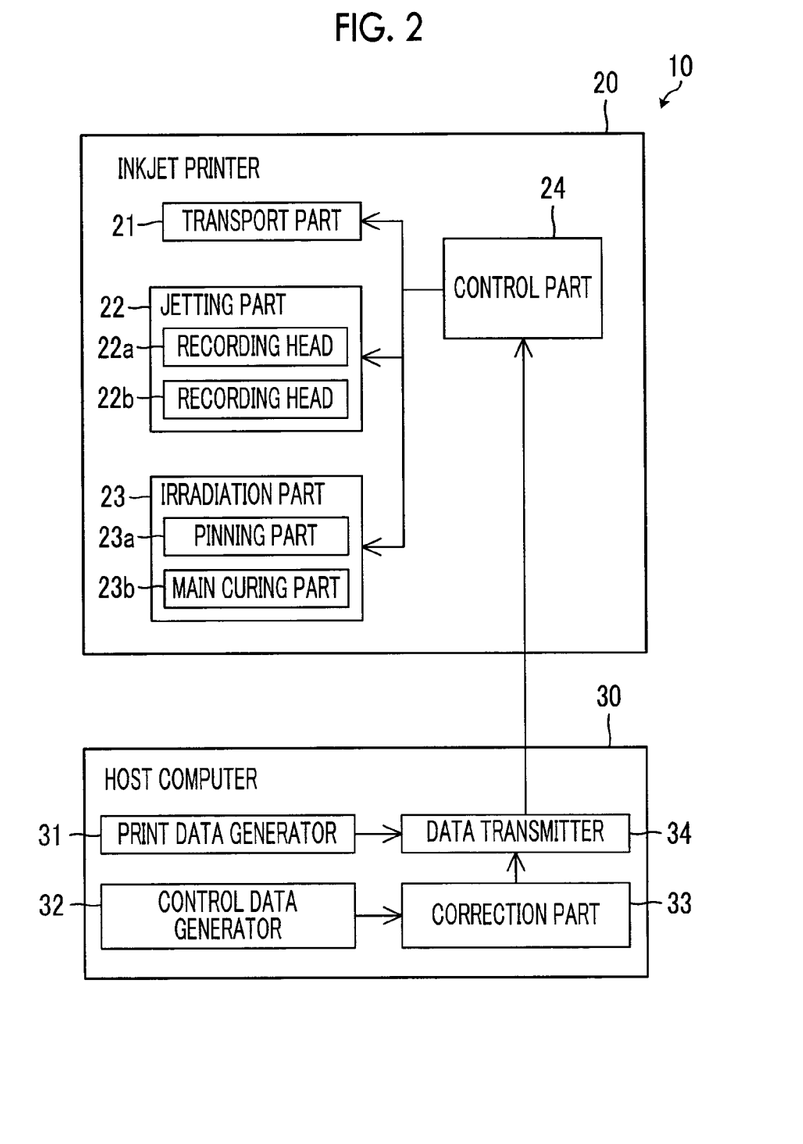
FIG. 2 is a conceptual diagram showing a configuration of a decorative member manufacturing apparatus according to an embodiment of the present invention.

Explaining the configuration of the decorative member manufacturing apparatus 10 of the present embodiment, as shown in FIG. 2, the decorative member manufacturing apparatus 10 of the present embodiment includes an inkjet printer 20 and a host computer 30 as main constituent devices. FIG. 2 is a conceptual diagram showing the configuration of the decorative member manufacturing apparatus 10 of the present embodiment. Each of the inkjet printer 20 and the host computer 30 will be described below.

<Inkjet Printer>

Figure 3:
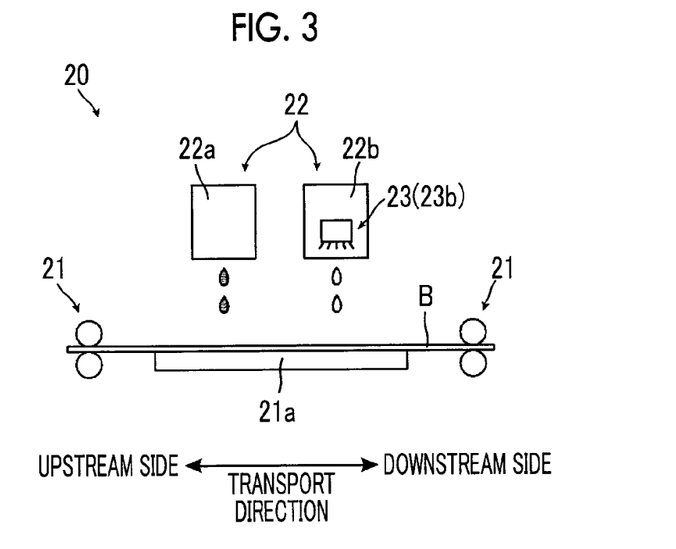
FIG. 3 is a schematic diagram showing a mechanical configuration of an inkjet printer.

The inkjet printer 20 is an apparatus which jets the color ink and the clear ink to form the decorative layer A on the surface of the base material, and as shown in FIG. 2, the inkjet printer 20 has a transport part 21, a jetting part 22, an irradiation part 23, and a control part 24. The transport part 21 transports the base material B along a predetermined transport direction, and may be configured by a transport roller as shown in FIG. 3, or may be configured by a transport belt. A platen 21a of FIG. 3 is disposed at an intermediate position on a transport path of the base material B. FIG. 3 is a diagram showing a mechanical configuration of the inkjet printer 20.

The jetting part 22 jets the color ink and the clear ink toward the surface of the base material while the base material B is placed on the platen 21a. The color ink is a colored ink containing a pigment or a dye, and is a general ink used for color printing and the like. The clear ink is a UV-curable type fluid cured by receiving light (specifically, ultraviolet rays). The fluid jetted by the jetting part 22 may be a fluid which can be cured by irradiation with light, and examples of the irradiation light include ultraviolet rays, infrared rays, and visible light. In addition, a main component of the fluid is a composition including at least a polymerizable compound and a photoinitiator, and examples thereof include a cationic polymerization type ink composition, a radical polymerization type ink composition, and an aqueous ink composition.

Figure 4:
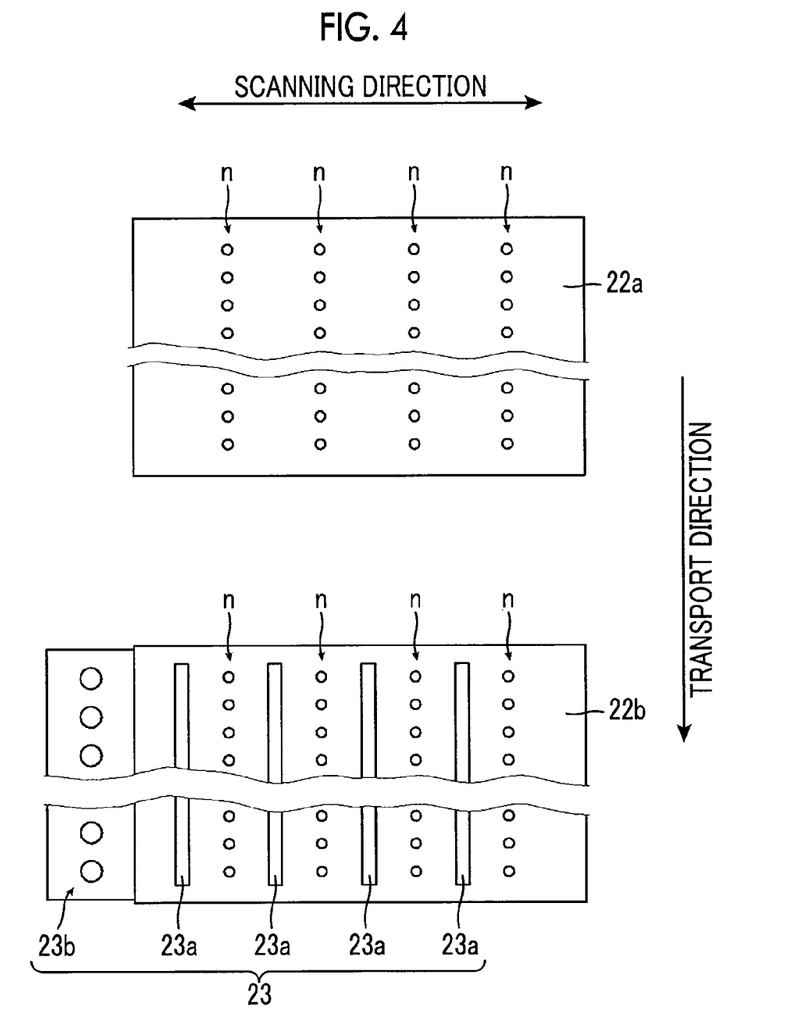
FIG. 4 is a diagram showing a nozzle surface of a recording head.

In the present embodiment, as shown in FIG. 2, the jetting part 22 has two types recording heads (inkjet heads) 22a and 22b, and forms the decorative layer A on the surface of the base material by a shuttle scan method. The first recording head 22a jets the color ink, and on the lower surface (nozzle surface) of the first recording head 22a, as shown in FIG. 4, a plurality of nozzles n (nozzle groups) arranged in a row along the transport direction is provided for each color of the color ink, specifically, for each of yellow (Y), black (K), cyan (C), and magenta (M). FIG. 4 is a diagram showing nozzle groups formed on the lower surface of the recording heads 22a and 22b.

The second recording head 22b jets the clear ink, and on the lower surface of the second recording head 22b, as shown in FIG. 4, a plurality of nozzle groups arranged in a row along the transport direction is provided at intervals along a direction (scanning direction) orthogonal to the transport direction. In addition, the recording head 22b for the clear ink is disposed on the downstream side of the transport direction with respect to the recording head 22a for the color ink.

The recording heads 22a and 22b are respectively disposed at positions directly larger than the platen 21a, and reciprocate (scan) along the scanning direction. While each of the recording heads 22a and 22b moves along the scanning direction, by driving a piezo element (not shown) built in the recording heads 22a and 22b, liquid droplets of ink of the type corresponding to each nozzle n are jetted from each nozzle n. The jetted liquid droplets of ink land on the surface of the base material to form dots. The method of jetting ink is not limited to the method of using the piezo element (piezoelectric element). Instead of the piezo method, various methods such as a thermal jet method in which ink is heated by a heating element such as a heater to generate bubbles and ink droplets are blown by the pressure can be applied.

In the present embodiment, since the recording head 22b for the clear ink is disposed on the downstream side of the recording head 22a for the color ink, in the surface of the base material, clear ink dots are formed on locations where color ink dots are formed (that is, landing point of the color ink). Furthermore, since a plurality of nozzle groups are provided along the scanning direction on the lower surface of the recording head 22b for the clear ink, in one scanning (movement) of the recording head 22b, the clear ink can be jetted multiple times (strictly, the number of times corresponding to the number of groups of nozzles, which is 4 times in the configuration shown in FIG. 4) toward the same location on the surface of the base material. As a result, a plurality of clear ink dots can be superimposed on the respective portions on the surface of the base material.

In the present embodiment, the recording head 22a for the color ink and the recording head 22b for the clear ink are provided separately, but the present invention is not limited thereto. For example, the jetting part 22 may be configured to jet both the color ink and the clear ink from one recording head. In addition, the recording head 22a for the color ink may be provided for each color (specifically, for each YMCK four-color). In addition, in the present embodiment, the recording heads 22a and 22b are serial type heads and print by the shuttle scan method, but the present invention is not limited thereto. For example, printing may be performed by a single-pass method using a full-line type head.

The irradiation part 23 irradiates the clear ink which has landed on the surface of the base material with light, more specifically, with ultraviolet rays. The clear ink dots which have received ultraviolet rays irradiated from the irradiation part 23 are cured. As the irradiation part 23, a metal halide lamp, a high-pressure mercury lamp, an ultraviolet light emitting diode (LED), and the like can be used.

In the present embodiment, as shown in FIGS. 2 and 4, the irradiation part 23 has a pinning part 23a and a main curing part 23b. The pinning part 23a irradiates ultraviolet rays with an irradiation intensity at a level at which the clear ink dots are semi-cured. The semi-curing is a state in which the clear ink is not completely cured but is cured to the extent that the dot shape can be maintained (that is, the flow does not spread). The main curing part 23b irradiates ultraviolet rays with an irradiation intensity at a level at which the semi-cured clear ink dots are main-cured (completely cured).

In addition, in the present embodiment, a plurality of pinning parts 23a is arranged on the lower surface of the recording head 22b for the clear ink. Furthermore, the pinning part 23a is provided for each of the nozzle groups for jetting the clear ink. Furthermore, as shown in FIG. 4, each pinning part 23a is disposed at a position adjacent to the corresponding nozzle row in the scanning direction. As a result, the clear ink (clear ink dots) which is jetted from the nozzles n of each nozzle group and lands on the surface of the base material is semi-cured by receiving ultraviolet rays irradiated from the pinning part 23a immediately after the landing. In addition, in the present embodiment, as described above, a new clear ink can be superimposed and land on the semi-cured clear ink dots, and dots of the new clear ink are also semi-cured by receiving ultraviolet rays from the pinning part 23a immediately after the landing.

Thereafter, the main curing part 23b irradiates the superimposed semi-cured clear ink with ultraviolet rays. Specifically, as shown in FIG. 4, the main curing part 23b is disposed on the side of the recording head 22b for the clear ink, and moves in the scanning direction together with the recording head 22b. While the recording head 22b moves, the main curing part 23b irradiates ultraviolet rays toward a portion of the surface of the base material, through which all the pinning parts 23a have passed. As a result, the superimposed clear ink (clear ink dots) in a semi-cured state on the surface of the base material is main-cured by receiving ultraviolet rays irradiated from the main curing part 23b. As a result, the cured convex portions E are formed at respective portions on the surface of the base material. Here, the thickness of the cured convex portion E formed in the respective portions is a thickness corresponding to the number of superimposed clear ink dots in the respective portions (in other words, a total thickness of each of the superimposed clear ink dots).

The disposed position and number of dispositions of the pinning part 23a and the main curing part 23b are not particularly limited. For example, the pinning part 23a and the main curing part 23b may be disposed on the side end portion of the platen 21a and may irradiate ultraviolet rays from the side of the base material B.

The control part 24 is a controller built in the inkjet printer 20, and controls each of the transport part 21, the jetting part 22, and the irradiation part 23 through a drive circuit. Specifically, in a case where the control part 24 receives an instruction for manufacturing a decorative member sent from the host computer 30, the control part 24 controls the transport part 21 to intermittently transport the base material B set at a predetermined position of the inkjet printer 20 along the transport direction.

In addition, until the intermittent transporting of the base material B by the transport part 21 is halted and restarted, the control part 24 controls the jetting part 22 (strictly, the recording head 22a for the color ink) based on print data. The print data is data sent from the host computer 30 together with the instruction for manufacturing a decorative member, and defines a jet amount of the color ink (in other words, the size of the color ink dots), a jet timing, a landing position (in other words, a formation position of ink dots), and the like. Since the recording head 22a for the color ink jets the color ink of each color toward the surface of the base material under the control of the control part 24, the color ink dots of each color are formed on the surface of the base material at a portion facing the nozzle surface of the recording head 22a. In a case where the control part 24 alternately repeats an intermittently transporting step of the base material B by the transport part 21 and a jetting step of the color ink by the recording head 22a, the color ink image C consisting of the color ink dots of each color is formed on the surface of the base material.

In addition, until the intermittent transporting of the base material is halted and restarted, the control part 24 controls the jetting part 22 (strictly, the recording head 22b for the clear ink) based on control data. The control data is data sent from the host computer 30 together with the instruction for manufacturing a decorative member, and defines a jet amount of the clear ink, a jet timing, the number of times that the clear ink is superimposed on the respective portions on the surface of the base material (in other words, the thickness of the cured convex portion E formed at the respective portions on the surface of the base material), and the like. That is, it can be said that the control data is data for forming the cured convex portion E having a set thickness at the respective portions on the surface of the base material.

Under the control of the control part 24, the recording head 22b for the clear ink jets clear ink toward the respective portions on the surface of the base material, and clear ink dots are superimposed at the number of times corresponding to the respective portions. In this case, the control part 24 controls the irradiation part 23 (specifically, each pinning part 23a and the main curing part 23b) to irradiate ultraviolet rays with a predetermined irradiation intensity. As a result, the clear ink dots which have landed on the surface of the base material are semi-cured immediately after the landing, and are main-cured after the clear ink dots are superimposed at a predetermined number of times. As a result, the cured convex portion E having a thickness defined by the control data is formed on the surface of the base material at a portion facing the nozzle surface of the recording head 22b. In a case where the control part 24 alternately repeats an intermittently transporting step of the base material B by the transport part 21, a jetting step of the clear ink by the recording head 22b, and an irradiation step of ultraviolet rays by the irradiation part 23, the clear ink image D consisting of the cured convex portion E is formed on the color ink image C which is formed on the surface of the base material.

<Host Computer>

The host computer 30 is communicably connected to the inkjet printer 20, and executes a program such as an application program for manufacturing a decorative member and a printer driver. The printer driver converts data (image data) of image generated by the application program for manufacturing a decorative member into the above-described print data.

In addition, the printer driver generates the above-described control data according to the above-described image data and tactile mode specified by a user (manufacturer of the decorative member) in a case of executing the application program for manufacturing a decorative member. The tactile mode is a mode in which the user can specify the tactile sensation (texture) of the decorative layer A included in the decorative member as a final product. More specifically, the tactile mode is determined by the user specifying from a plurality of candidates set with regard to the unevenness degree of the decorative layer A (for example, a mode in which the surface is "rough" and a mode in which the surface is "smooth").

The printer driver may be recorded on a recording medium, such as an optical disk, which can be read by the host computer 30, or may be downloadable to the host computer 30 through a communication network such as Internet.

As shown in FIG. 2, the host computer 30 has a print data generator 31, a control data generator 32, a correction part 33, and a data transmitter 34.

The print data generator 31 receives the image data from the application program for manufacturing a decorative member, and generates the print data from the image data. The image data is color image data indicating the original image of the color ink image C formed on the surface of the base material. The print data generator 31 executes resolution conversion processing, color conversion processing, halftone processing, and rasterization processing on the received image data.

The resolution conversion processing is a process of converting the image data into a resolution reproducible by the inkjet printer 20, and specifically, converting the image data into data showing each gradation value (specifically, a value of 0 to 255) of red (R), green (G), and blue (B). In the color conversion processing, with reference to a color conversion look-up table (not shown), the colors indicated by the resolution-converted image data (that is, RGB tri-color) are converted into colors of ink which can be jetted by the inkjet printer 20 (that is, YMCK four-color). The halftone processing is a process of converting the image data converted to gradation values of each YMCK color by the color conversion processing into color ink dot size data formed on each pixel. The rasterization processing is a process of dividing the halftone-processed image data into pixel units, and rearranging the pixel units in the order in which the pixel units will be transferred to the inkjet printer 20.

Figure 5:
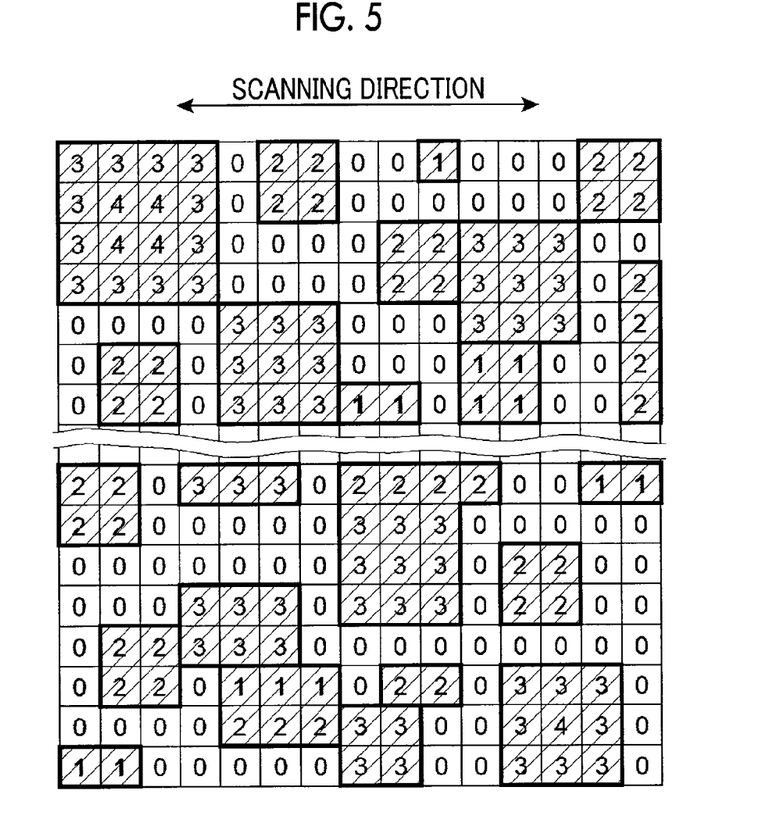
FIG. 5 is an explanatory diagram of control data.

The control data generator 32 receives, from the application program for manufacturing a decorative member, the image data and a specification result of the tactile mode, and generates the control data based thereon. Specifically, the thickness of each portion of the decorative layer A, that is, the thickness of the cured convex portion E formed on each portion is set from color information and density (gradation value) of each pixel indicated by the image data and the specified tactile mode. Thereafter, control data shown in FIG. 5 is generated by converting the set thickness of the cured convex portion E into the thickness for each pixel. FIG. 5 is an explanatory diagram of the control data. For the convenience of illustration, the number of pixels shown in FIG. 5 is smaller than the actual number of pixels.

Explaining the control data with reference to FIG. 5, the thickness, more accurately, the number of times that the clear ink dots are superimposed is specified for each pixel (minimum grid in FIG. 5). Here, in FIG. 5, the numerical value described in each pixel corresponds to the set value of the thickness. In addition, in the control data, pixel groups of one pixel or two or more adjacent pixels (hatched pixels in FIG. 5) having a thickness value of 1 or more exist in a floating island shape, and each pixel in these pixel groups corresponds to a pixel constituting the cured convex portion E.

The control data is not limited to the above-described data, and other data can also be considered. For example, data indicating the thickness of the cured convex portion E may be used as bitmap value data in the same manner as the image data.

The correction part 33 performs correction processing on the control data generated by the control data generator 32. The correction processing is a process for reducing a thickness of the cured convex portion E formed on the decorative layer A, the thickness being difficult for humans to recognize. By performing the correction processing, it is possible to reduce consumption of the clear ink and improve the manufacturing speed of the decorative member. Hereinafter, the correction processing will be described in detail.

The correction processing is a process of reducing the thickness of the cured convex portion E corresponding to a spatial frequency equal to or smaller than the set value, in a correspondence relationship between the thickness and spatial frequency of the cured convex portion E which is formed on the respective portions on the surface of the base material, in a case where the control part 24 controls the jetting part 22 based on the control data.

More specifically, the correction processing is a process of weighting the thickness of the cured convex portion E according to the corresponding spatial frequency. In the correction processing, a weight of less than 1 is given to the thickness of the cured convex portion E corresponding to the spatial frequency equal to or smaller than the set value, and a weight equal to 1 is given to the thickness of the cured convex portion E corresponding to a spatial frequency larger than the set value. In addition, a weight given to the thickness of the cured convex portion E corresponding to the spatial frequency equal to or smaller than the set value increases as the spatial frequency increases.

In addition, in performing the above-described weighting, the correction part 33 performs the correction processing using a weighting filter.

Even in a case where the control data is the bitmap value data, the correction processing can be performed by performing frequency decomposition weighting filter processing according to the following procedure. By the way, control data after the correction processing is also bitmap value data.

Explaining specific procedure of the correction processing, in the correction processing, first, the correction part 33 performs frequency decomposition on the control data generated by the control data generator 32. In the frequency decomposition, for example, Fourier transform or the like is applied to convert the control data which is real space data into frequency-space data.

In the control data in which the frequency decomposition is performed, the thickness of the cured convex portion E formed at the respective portions on the surface of the base material and the spatial frequency of the cured convex portion E having that thickness are associated with each other. To give a specific example, for example, in a case where the control data shown in FIG. 5 is subjected to the frequency decomposition, a spatial frequency of the cured convex portion E having a thickness of 1 is set to f1, a spatial frequency of the cured convex portion E having a thickness of 2 is set to f2, a spatial frequency of the cured convex portion E having a thickness of 3 is set to f3, and a spatial frequency of the cured convex portion E having a thickness of 4 is set to f4. As a result, the above correspondence relationship is clarified.

Next, the correction part 33 applies a weighting filter to the frequency-decomposed control data, and weights the thickness of the cured convex portion E corresponding to each spatial frequency. The weighting filter is a filter created based on an equal sensation curve shown in FIG. 6. The equal sensation curve is a curve that shows changes in feature amount of stimulus that a person feels with the same intensity by tactile sensation in association with generation frequency of the stimulus. Here, the equal sensation curve shown in FIG. 6 is a curve that, even though vibration levels are physically different from each other, expresses a group of vibration stimuli which are felt at the same level on a human finger (specifically, base of the thumb) in the space of vibration parameters (Verrillo et al., (1969)).

Figure 6:
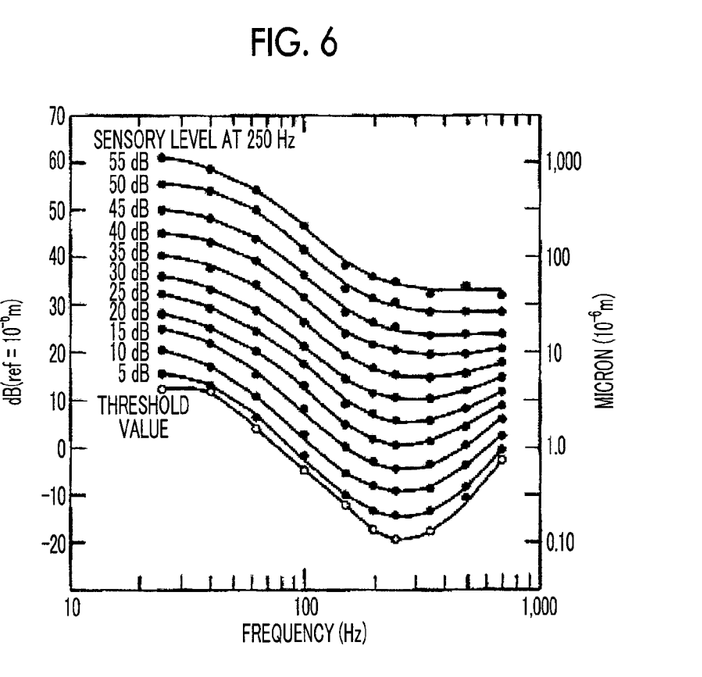
FIG. 6 is a diagram showing an equal sensation curve.

Each equal sensation curve shown in FIG. 6 is drawn by plotting feature amounts (amplitudes) which are perceived as having the same intensity by changing the vibration frequency in a case where, using a 2.9 cm² vibration surface, a sensory level at a reference frequency of 250 Hz reaches the threshold level and a case where the sensory level respectively reaches each level set at 5 dB intervals within the range of 5 dB to 55 dB. By the way, as is clear from FIG. 6, the reference frequency of 250 Hz corresponds to the generation frequency of the stimulus having the smallest feature amount (amplitude) in the equal sensation curve.

In the equal sensation curve shown in FIG. 6, the weighting filter is created based on a curve (hereinafter, reference curve) in which the sensory level at the reference frequency of 250 Hz is 40 dB. This is because the vibration level (amplitude) at the reference frequency of 250 Hz is approximately 10 μm in the reference curve, and the amplitude corresponds to the thickness of a normal convex portion formed by the inkjet printer 20 using the clear ink.

Figure 7:
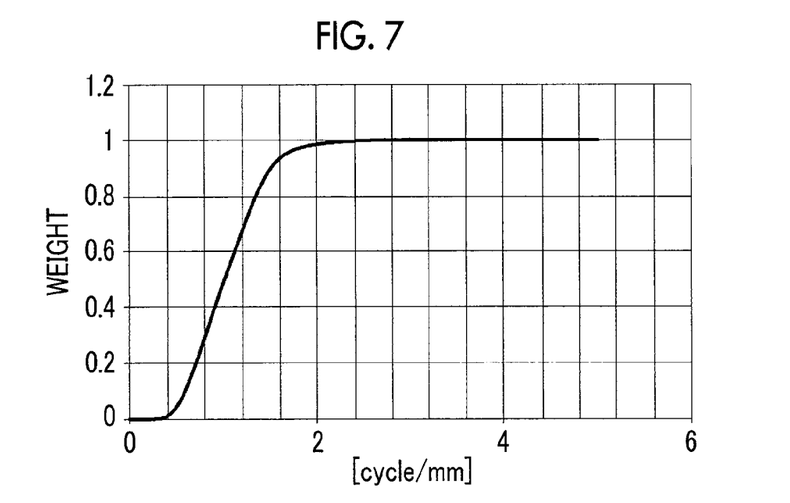
FIG. 7 is a diagram showing a weighting function.

Using the reference curve, a weighting function shown in FIG. 7 is defined in consideration that the average speed in a case where a person traces the surface of an object with fingertips is 14 cm/s. The weighting function is a function for determining the weighting according to the spatial frequency based on the reference curve, and the weighting filter expresses this weighting function as a band filter.

The weighting function shown in FIG. 7 is merely an example, and other weighting functions can be considered. For example, in the weighting function shown in FIG. 7, a weight equal to or smaller than a spatial frequency corresponding to the sensitivity limit described later is set to 0, but a weighting function in which the weight is a value other than 0 (specifically, a value slightly larger than 0) even in a range equal to or smaller than the spatial frequency corresponding to the sensitivity limit may be used.

In addition, in the present embodiment, the weighting filter is a high-pass filter in which a peak value is set in a range of 1 to 6.5 cycle/mm, and more suitably, the peak value is set in a range of 1.8 cycle/mm (=250 Hz÷14 cm/s). Here, the peak value of the high-pass filter corresponds to the above-described set value. In addition, in a case where the peak value of the high-pass filter is 1.8 cycle/mm, the above-described set value is a value set according to the generation frequency (that is, 250 Hz) of the stimulus having the minimum feature amount in the equal sensation curve shown in FIG. 6.

In the present embodiment, generation frequency of the stimulus having the minimum feature amount in the equal sensation curve is 250 Hz, but the frequency at which the feature amount can be the minimum value in the equal sensation curve is within a range of 200 Hz to 1000 Hz. A frequency within the range can be adopted, and a frequency within a range of 250 Hz to 300 Hz is more preferably adopted and a frequency of 250 Hz is particularly preferably adopted.

The correction part 33 applies the above-described weighting filter to the control data in which the frequency decomposition is performed (that is, the control data expressed in the frequency space). As a result, a weight of less than 1 is given to the thickness of the cured convex portion E corresponding to the spatial frequency equal to or smaller than the set value (peak value of the filter), and a weight equal to 1 is given to the thickness of the cured convex portion E corresponding to a spatial frequency larger than the set value. In addition, as can be seen from FIG. 7, a greater weight is given to the thickness of the cured convex portion E corresponding to the spatial frequency equal to or smaller than the set value as the spatial frequency increases.

Hereinafter, the weighting of the thickness will be described with a specific example. In a case where the control data shown in FIG. 5 is subjected to the frequency decomposition, as described above, the spatial frequencies of the cured convex portion E having thicknesses of 1, 2, 3, and 4 are respectively set to f1, f2, f3, and f4, and further, it is assumed that the following magnitude relationship is established between these spatial frequencies and the above-described set value (peak value of the weighting filter).

Set value<f1, f2, f3 f4<Set value

In the above-described case, since the spatial frequencies of each of the cured convex portions E having the thicknesses of 1, 2, and 3 exceed the set value, a weight of 1 is given to these cured convex portions E. On the other hand, with regard to the cured convex portion E having a thickness of 4, since the spatial frequency thereof is equal to or smaller than the set value, a weight of less than 1 is given thereto. In this case, a greater weight is given to the cured convex portion E having a thickness of 4 as the spatial frequency thereof increases. On the contrary, in a case where the spatial frequency equal to or smaller than the set value is lowered to be equal to or smaller than a threshold value, a weight having a value of 0 (zero) is given. Here, the threshold value is a value smaller than the above-described set value, and is a limit value of a spatial frequency of the cured convex portion E, in which the person can recognize the cured convex portion E by the tactile sensation.

In the present embodiment, it is considered that 25 Hz or less corresponds to the sensitivity limit in the equal sensation curve, and in consideration that the average speed in a case where a person traces the surface of an object with fingertips is 14 cm/s, the threshold value is 0.18 cycle/mm from these values. However, the threshold value is not limited to the above-described value, and other values can also be adopted. For example, it is known that the speed at which the fingertip moves fluctuates in a range of 3 cm/s to 25 cm/s, and the threshold value may be determined according to this range.

Figure 8:
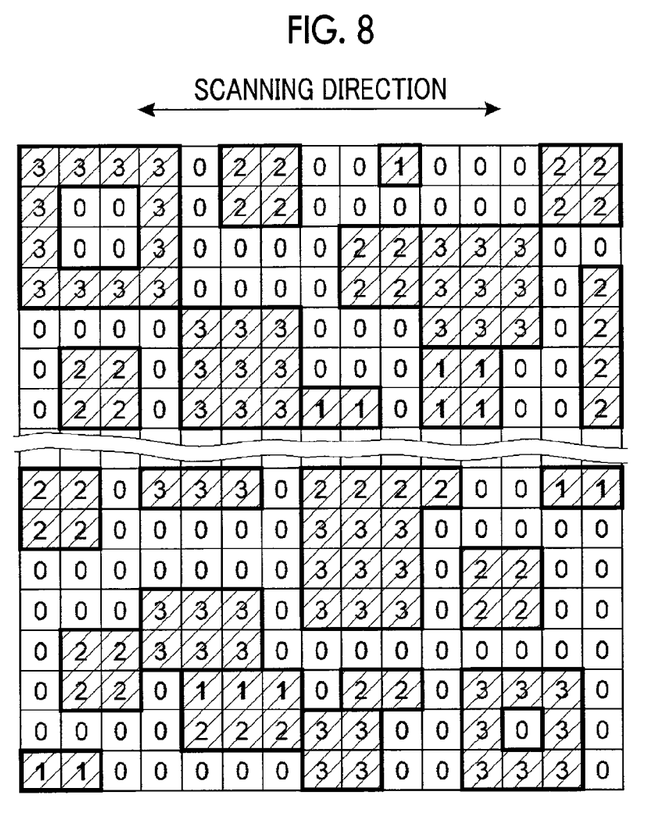
FIG. 8 is an explanatory diagram of corrected control data.

By the way, in the above-described case given as a specific example, the spatial frequency of the cured convex portion E having a thickness of 4 is equal to or smaller than the threshold value, and in the correction processing, the thickness of the cured convex portion E is corrected to 0 as shown in FIG. 8. FIG. 8 is an explanatory diagram of corrected control data.

The thickness of the cured convex portion E in which the spatial frequency is equal to or smaller than the threshold value may be set to 0 as in the above-described case, or may be set to a value other than 0 (for example, a value slightly larger than 0).

After performing the weighting processing, the correction part 33 applies inverse Fourier transform to the control data after the weighting processing, and returns the frequency-space control data to the real space data. As described above, in the correction processing of the present embodiment, the control data is converted into frequency-space data, the weighting filter is applied to the converted control data, and the control data is returned to real space data after the weighting processing. However, the present invention is not limited thereto, and the control data may be expressed as a function in real space, and this function and a function (weighting function) corresponding to a weighting filter may be convoluted. In this case as well, the control data can be corrected.

In a case where the decorative layer A is formed on the surface of the base material according to the corrected control data after performing the correction processing, the thickness of the cured convex portion E corresponding to the spatial frequency equal to or smaller than the set value is reduced, and the thickness of the cured convex portion E corresponding to the spatial frequency equal to or smaller than the threshold value is 0. Explaining the case of the above-described specific example in an easy-to-understand manner, as can be seen from FIGS. 5 and 8, with regard to each cured convex portion E in which the thicknesses are respectively set to 1, 2, and 3 in the control data before the correction, the thicknesses are continuously set to 1, 2, and 3 even after the correction. On the other hand, with regard to the cured convex portion E in which the thickness is set to 4 in the control data before the correction, the thickness is reduced by the correction, and strictly, is 0. Therefore, in a case where the decorative layer A is formed on the surface of the base material by the inkjet printer 20 according to the corrected control data, in the decorative layer A, the thickness of the cured convex portion E, which is initially set to 4, is 0. As a result, the consumption of the clear ink can be reduced.

By the way, even in a case where the control data is bitmap value data, it is preferable to input the corrected control data (bitmap value) as a control signal for ink jetting and jet the clear ink to each portion on the surface of the base material according to the control signal. As a result, the thickness of the cured convex portion E corresponding to the spatial frequency equal to or smaller than the set value is reduced, and the consumption of the clear ink can be reduced.

As described above, in the present embodiment, in cured convex portion E formed on the decorative layer A, the control data is corrected so as to reduce the thickness of the cured convex portion E corresponding to the spatial frequency difficult to recognize with the touch of a human fingertip (specifically, spatial frequency equal to or smaller than the set value). More specifically, in the reference curve in the equal sensation curve shown in FIG. 6, the feature amount (amplitude) of the stimulus is minimum at the reference frequency of 250 Hz, and in a band less than the reference frequency of 250 Hz, the feature amount of the stimulus increases as the frequency decreases. That is, in the frequency band of the reference frequency of 250 Hz or less, the sensitivity of the human fingertip is dull.

Based on the above, in the present embodiment, the thickness of the cured convex portion E corresponding to the spatial frequency equal to or smaller than the set value (specifically, 1.8 cycle/mm) corresponding to the reference frequency of 250 Hz is corrected so as to be smaller than the value before the correction. Such a configuration is different from the one, such as the above-described apparatuses disclosed in JP2016-013671A and JP2016-074146A, that changes the operating condition of the apparatus or corrects the control data (unevenness data) for the purpose of forming the unevenness well. That is, in the present embodiment, the control data is corrected for a purpose different from the purpose disclosed in JP2016-013671A and JP2016-074146A, and specifically, the control data is corrected for the purpose of reducing the amount of clear ink used (specifically, the number of droplets) without impairing the texture of the decorative layer A (specifically, the unevenness felt by a person).

By reducing the amount of clear ink used, it is possible to reduce the manufacturing cost of the decorative member and improve the manufacturing speed. Such an effect is particularly effective in the inkjet printer 20 which originally adopts the shuttle scan method in which the drawing speed is relatively slow.

[Method for Manufacturing Decorative Member]

Figure 9:
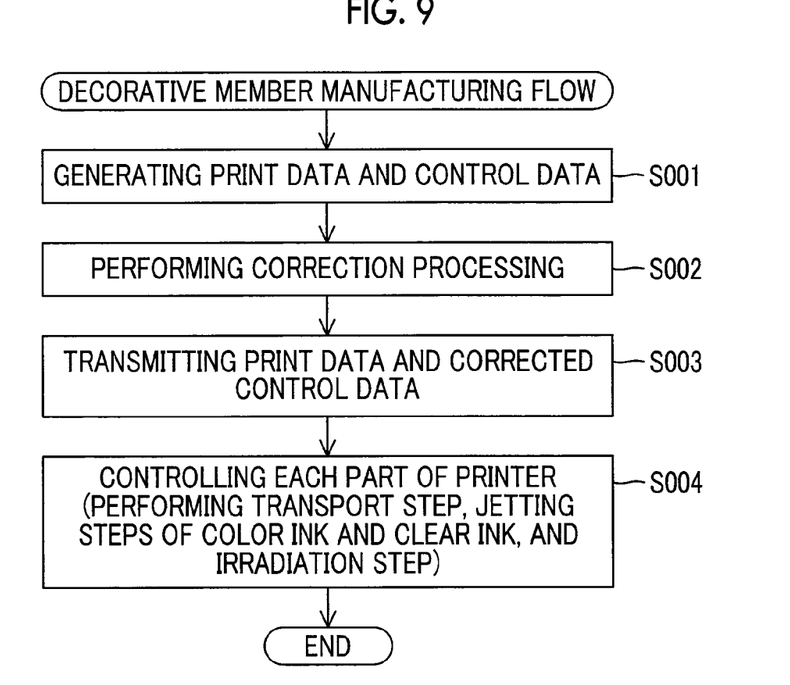
FIG. 9 is a diagram showing a procedure of a decorative member manufacturing flow.

Next, a method for manufacturing a decorative member using the above-described decorative member manufacturing apparatus 10 will be described with reference to FIG. 9. FIG. 9 is a diagram showing a procedure of a decorative member manufacturing flow.

In the decorative member manufacturing flow, first, print data and control data are created in the host computer 30 in cooperation with the application program for manufacturing a decorative member and the printer driver (S001). Thereafter, the correction part 33 of the host computer 30 performs the correction processing on the control data (S002). By the correction processing, the correspondence relationship between the thickness and spatial frequency of the cured convex portion E formed in a case where the jetting part 22 is controlled based on the control data is specified, and in the correspondence relationship, the thickness corresponding to the spatial frequency equal to or smaller than the set value is reduced. Specifically, with regard to the thickness corresponding to the spatial frequency equal to or smaller than the set value, the weighting filter gives a weight of less than 1, and the thickness is corrected to be a weighted thickness. With regard to the thickness corresponding to the spatial frequency equal to or smaller than the threshold value, the thickness is corrected to be 0 (zero).

Thereafter, the print data and the corrected control data are transmitted from the host computer 30 to the inkjet printer 20 together with the instruction for manufacturing the decorative member (S003). In a case where the print data and the corrected control data are received from the host computer 30, the control part 24 of the inkjet printer 20 controls each part of the printer according to these data (S004). That is, the control part 24 of the inkjet printer 20 intermittently performs a transporting step of the base material B by the transport part 21, and while the transporting step is halted, the jetting step of the color ink by the jetting part 22 is performed. In the jetting step of the color ink, the control part 24 controls the recording head 22a based on the print data. As a result, the color ink image C corresponding to the print data is formed on the surface of the base material.

In addition, while the transporting step is halted, the control part 24 performs the jetting step of the clear ink by the jetting part 22 and the irradiation step by the irradiation part 23. In the jetting step of the clear ink, the control part 24 controls the recording head 22b based on the corrected control data. In addition, in the irradiation step, the control part 24 controls the pinning part 23a and the main curing part 23b based on the corrected control data. As a result, the clear ink image D is superimposed on the color ink image C formed on the surface of the base material to form the decorative layer A. In the decorative layer A formed according to the corrected control data, in thickness of the cured convex portion E formed in each portion of the decorative layer A, a thickness corresponding to the spatial frequency equal to or smaller than the set value is smaller than a thickness before the correction.

Figure 10:
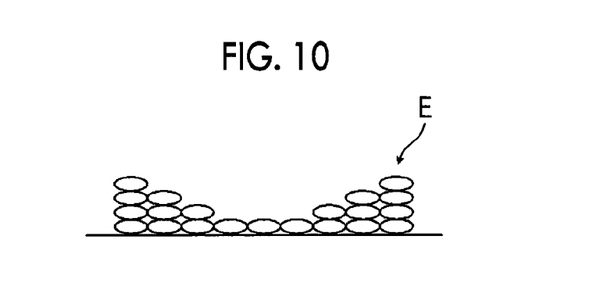
FIG. 10 is a schematic cross-sectional view of a cured convex portion in which a thickness has been reduced by correction.

As shown in FIG. 10, the cured convex portion E in which the thickness has been reduced by the correction has a shape in which a central portion of the cured convex portion E is recessed in a crater shape by an amount corresponding to the amount of reduction in thickness. FIG. 10 is a schematic cross-sectional view of the cured convex portion E in which a thickness has been reduced by the correction.

In a case where the respective jetting steps of the color ink and the clear ink and the irradiation step are completed, the decorative layer A is formed on the surface of the base material. Thereafter, the transporting step is repeated until the base material B on which the decorative layer A is formed (that is, the decorative member) reaches the exhaust port of the inkjet printer 20, and immediately before a timing at which the decorative member is exhausted, the decorative member manufacturing flow ends.

According to the decorative member manufacturing flow described above, by controlling the jetting of the clear ink in consideration of the sensitivity (tactile sensation) of the human fingertip, the amount of clear ink used (the number of droplets) can be reduced without impairing the texture of the decorative layer A. As a result, it is possible to suppress the manufacturing cost and manufacture the decorative member at a faster manufacturing speed.

EXPLANATION OF REFERENCES

10: decorative member manufacturing apparatus
20: inkjet printer
21: transport part
21a: platen
22: jetting part
22a, 22b: recording head
23: irradiation part
23a: pinning part
23b: main curing part
24: control part
30: host computer
31: print data generator
32: control data generator
33: correction part
34: data transmitter
A: decorative layer
B: base material
C: color ink image
D: clear ink image
E: cured convex portion
n: nozzle

What is claimed is:

1. A decorative member manufacturing apparatus for manufacturing a decorative member having a decorative layer provided on a surface of a base material, the decorative member manufacturing apparatus comprising:
   a jetting part that jets a fluid toward the surface of the base material, the fluid being cured by receiving light, wherein the jetting part comprises inkjet heads;
   a light emitting device that, to form a cured convex portion constituting the decorative layer on respective portions on the surface of the base material, irradiates the fluid which has landed on the respective portions with light;
   a controller that controls the jetting part based on control data for forming the cured convex portion having a set thickness in the respective portions; and
   a host computer that performs correction processing on the control data, the correction processing being a process of reducing a thickness corresponding to a spatial frequency equal to or smaller than a set value, in a correspondence relationship between the thickness and spatial frequency of the cured convex portion which is formed in a case where the controller controls the jetting part based on the control data,
   wherein the correction processing is a process of weighting a thickness of the cured convex portion according to a spatial frequency corresponding thereto, and
   in the correction processing, a weight of less than 1 is given to the thickness of the cured convex portion corresponding to the spatial frequency equal to or smaller than the set value, and a weight equal to 1 is given to a thickness of the cured convex portion corresponding to a spatial frequency larger than the set value.

2. The decorative member manufacturing apparatus according to claim 1,
wherein the host computer performs the correction processing using a weighting filter,
the weighting filter is a filter created based on an equal sensation curve indicating a change in feature amount of a stimulus that a person feels to have the same intensity by a tactile sensation in association with a generation frequency of the stimulus, and
the set value is a value set according to the generation frequency of the stimulus having a minimum feature amount in the equal sensation curve.

3. The decorative member manufacturing apparatus according to claim 2,
wherein the generation frequency of the stimulus, at which the feature amount is smallest in the equal sensation curve, is 250 Hz.

4. The decorative member manufacturing apparatus according to claim 3,
wherein the correction processing is a process of reducing the thickness of the cured convex portion corresponding to the spatial frequency equal to or smaller than the set value in the correspondence relationship, and setting a thickness of the cured convex portion corresponding to a spatial frequency equal to or smaller than a threshold value which is smaller than the set value in the correspondence relationship to 0, and
the threshold value is a limit value of a spatial frequency of the cured convex portion, at which the person can recognize the cured convex portion by a tactile sensation.

5. The decorative member manufacturing apparatus according to claim 3,
wherein, in the cured convex portions generated in a case where the controller controls the jetting part based on the corrected control data, a central portion of the cured convex portion that the thickness has been reduced by the correction is recessed by an amount corresponding to an amount of reduction in thickness.

6. The decorative member manufacturing apparatus according to claim 2,
wherein the weighting filter is a high-pass filter in which a peak value is set in a range of 1 to 6.5 cycle/mm.

7. The decorative member manufacturing apparatus according to claim 6,
wherein the correction processing is a process of reducing the thickness of the cured convex portion corresponding to the spatial frequency equal to or smaller than the set value in the correspondence relationship, and setting a thickness of the cured convex portion corresponding to a spatial frequency equal to or smaller than a threshold value which is smaller than the set value in the correspondence relationship to 0, and
the threshold value is a limit value of a spatial frequency of the cured convex portion, at which the person can recognize the cured convex portion by a tactile sensation.

8. The decorative member manufacturing apparatus according to claim 2,
wherein the weighting filter is a high-pass filter in which a peak value is set to 1.8 cycle/mm.

9. The decorative member manufacturing apparatus according to claim 2,
wherein, in the correction processing, the weight given to the thickness of the cured convex portion corresponding to the spatial frequency equal to or smaller than the set value increases as the spatial frequency increases.

10. The decorative member manufacturing apparatus according to claim 2,
wherein the correction processing is a process of reducing the thickness of the cured convex portion corresponding to the spatial frequency equal to or smaller than the set value in the correspondence relationship, and setting a thickness of the cured convex portion corresponding to a spatial frequency equal to or smaller than a threshold value which is smaller than the set value in the correspondence relationship to 0, and
the threshold value is a limit value of a spatial frequency of the cured convex portion, at which the person can recognize the cured convex portion by a tactile sensation.

11. The decorative member manufacturing apparatus according to claim 2,
wherein, in the cured convex portions generated in a case where the controller controls the jetting part based on the corrected control data, a central portion of the cured convex portion that the thickness has been reduced by the correction is recessed by an amount corresponding to an amount of reduction in thickness.

12. The decorative member manufacturing apparatus according to claim 1,
wherein, in the correction processing, the weight given to the thickness of the cured convex portion corresponding to the spatial frequency equal to or smaller than the set value increases as the spatial frequency increases.

13. The decorative member manufacturing apparatus according to claim 12,
wherein the correction processing is a process of reducing the thickness of the cured convex portion corresponding to the spatial frequency equal to or smaller than the set value in the correspondence relationship, and setting a thickness of the cured convex portion corresponding to a spatial frequency equal to or smaller than a threshold value which is smaller than the set value in the correspondence relationship to 0, and
the threshold value is a limit value of a spatial frequency of the cured convex portion, at which the person can recognize the cured convex portion by a tactile sensation.

14. The decorative member manufacturing apparatus according to claim 12,
wherein, in the cured convex portions generated in a case where the controller controls the jetting part based on the corrected control data, a central portion of the cured convex portion that the thickness has been reduced by the correction is recessed by an amount corresponding to an amount of reduction in thickness.

15. The decorative member manufacturing apparatus according to claim 1,
wherein the correction processing is a process of reducing the thickness of the cured convex portion corresponding to the spatial frequency equal to or smaller than the set value in the correspondence relationship, and setting a thickness of the cured convex portion corresponding to a spatial frequency equal to or smaller than a threshold value which is smaller than the set value in the correspondence relationship to 0, and the threshold value is a limit value of a spatial frequency of the cured convex portion, at which the person can recognize the cured convex portion by a tactile sensation.

16. The decorative member manufacturing apparatus according to claim 1,
wherein, in the cured convex portions generated in a case where the controller controls the jetting part based on the corrected control data, a central portion of the cured convex portion that the thickness has been reduced by the correction is recessed by an amount corresponding to an amount of reduction in thickness.

17. A method for manufacturing a decorative member having a decorative layer provided on a surface of a base material, the method comprising:
   a jetting step of jetting, by a jetting part, a fluid toward the surface of the base material, the fluid being cured by receiving light, wherein the jetting part comprises inkjet heads; and
   an irradiation step of irradiating, by a light emitting device, the fluid which has landed on respective portions with light, to form a cured convex portion constituting the decorative layer on the respective portions on the surface of the base material,
   wherein, in the jetting step, the jetting part is controlled by a controller based on control data for forming the cured convex portion having a set thickness in the respective portions, and
   correction processing is performed by a host computer on the control data, the correction processing being a process of reducing a thickness corresponding to a spatial frequency equal to or smaller than a set value, in a correspondence relationship between the thickness and spatial frequency of the cured convex portion which is formed in a case where the controller controls the jetting part based on the control data,
   wherein the correction processing is a process of weighting a thickness of the cured convex portion according to a spatial frequency corresponding thereto, and
   in the correction processing, a weight of less than 1 is given to the thickness of the cured convex portion corresponding to the spatial frequency equal to or smaller than the set value, and a weight equal to 1 is given to a thickness of the cured convex portion corresponding to a spatial frequency larger than the set value.

* * * * *